Aug. 23, 1960

J. V. ARMENTROUT 2,950,126

MOBILE BIN

Filed Aug. 28, 1959

INVENTOR.
JOSEPH V. ARMENTROUT,
BY Allen & Allen
ATTORNEYS.

United States Patent Office 2,950,126
Patented Aug. 23, 1960

2,950,126

MOBILE BIN

Joseph Vincent Armentrout, Hamilton, Ohio, assignor to The Hamilton Caster & Mfg. Co., Hamilton, Ohio, a corporation of Ohio Filed Aug. 28, 1959, Ser. No. 836,821

7 Claims. (Cl. 280—179)

This invention relates to mobile bins and more particularly to a locking device by means of which such bins may be secured in place during transit.

Essentially, a mobile bin comprises a four-wheeled cart having both ends and one side enclosed, the remaining side being open to permit access to the interior of the cart which may be suitably divided by one or more shelves into a plurality of material receiving compartments. Such mobile bins are a refinement of the manual cart operation common in the motor freight industry. Basically, they are designed to improve service of LTL shipments by reducing the number of times the freight is handled. In the freight terminal, the mobile bins can be readily loaded, either from incoming trailer trucks or from freight on hand, whereupon the bins are moved directly into the outgoing delivery truck or trailer. As the driver makes his deliveries, the bins are gradually emptied; and the driver can segregate his pickups into the bin as he reloads the truck or trailer. Where this is done, the job at the freight terminal is simplified in that the freight need only to be counted and often the individual shipments need not be handled at all.

In the use of such mobile bins, it is highly desirable to provide means for securing the bins in the truck or trailer so that they will not shift in transit. While such bins have heretofore been provided with floor locks to hold them stationary on sloping floors, and the like, such locks are not adequate to maintain the bins securely in place in a truck or trailer, particularly during quick stops, sharp turns, and rapid acceleration.

Accordingly, a principal object of the instant invention lies in the provision of a simple yet efficient means for securely locking such mobile bins in a truck or trailer, the arrangement being such that the bins may be secured either to the walls of the trailer or to each other, as where a plurality of bins are placed side by side in a truck.

Still a further object of the invention is the provision of locking means of the character described which may be incorporated as an integral part of the push handle for the bin, which locking means is free from loose or dangling parts which would be in the way when not in use, the locking means being readily adjustable to securely fasten the bins in place and yet readily release them when it is desired to move the bins.

The foregoing objects, together with additional objects which will appear hereinafter or which will be apparent to the skilled worker in the art upon reading these specifications, I accomplish by that construction and arrangement of parts of which I shall now describe an exemplary embodiment, reference now being made to the accompanying drawings wherein.

Briefly, in the practice of the invention, the mobile bins are provided with a locking device which holds them securely in place during highway transit. To this end, the inner walls of the truck or trailer are equipped with brackets which are arranged to be engaged by the locking device on the bins. The locking device operates on the hook-and-eye principle, the hook being in the nature of a screw operatively connected to a conveniently located hand-wheel by means of which the hook may be utilized to draw the mobile bin tightly against the wall of the freight compartment. Similarly, where a second bin is juxtaposed to the first, the locking device may be utilized to securely fasten the second bin to the first instead of to the wall brackets.

Figure 1:
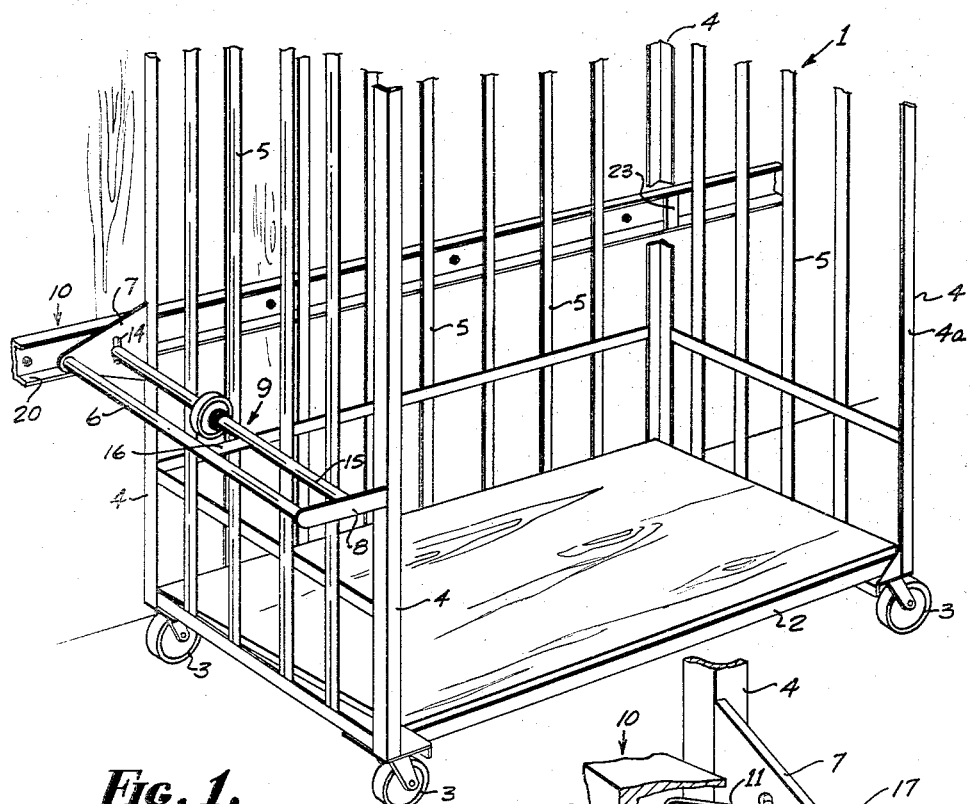
Figure 1 is a perspective view with parts broken away illustrating a mobile bin secured to the wall of a truck or trailer freight compartment.

Referring now to Figure 1 of the drawing, I have therein illustrated a mobile bin 1 which comprises a lower rectangular frame 2 having a plurality of swivel casters 3. Corner posts 4, preferably formed from angle bars, project upwardly from the lower frame 2, and three sides of the structure are closed, as by means of bars 5, and it will be understood that the structure may be provided with one or more shelves to define freight receiving compartments. It is to be understood that the construction of the bin is exemplary only, and numerous modifications may be made without departing from the spirit of the invention.

At one end the device is provided with a push handle 6 secured at its opposite ends to brackets 7 and 8 which may be welded or otherwise permanently secured to a pair of the corner posts 4. These brackets serve as the means for mounting the locking device 9 by means of which the mobile bin may be secured to a mounting means 10 secured to a wall of the truck, trailer or other mobile freight carrier.

Figure 3:
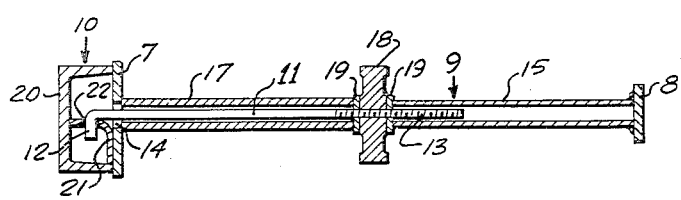
Figure 3 is a vertical sectional view taken through the locking bar mechanism.

As best seen in Figure 3, the locking device 9 comprises an elongated, rod 11 terminating at one end in a downwardly projecting hook 12 and at its other end in a threaded portion 13. The hooked end 12 of the rod passes through an elongated, vertically disposed slot 14 in bracket 7; and its opposite end is loosely received in a tubular sleeve 15 one end of which is welded or otherwise permanently secured to bracket 8. A supporting bar 16 (Figure 1) may be welded between the handle 6 and the sleeve 15 to rigidly mount the sleeve. A floating sleeve or spacer 17 surrounds the rod 11 and extends between the bracket 7 and a hand wheel 18 in threaded engagement with the threaded portion 13 of the rod. Preferably, a pair of washers 19 will surround the rod 11 on each side of the hand wheel.

With the arrangement just described, rotation of the hand wheel will result in axial movement of the rod 11 and, depending upon the direction of rotation, will move the hooked end 11 either toward or away from the bracket 7. Since the rod 11 is loosely received in fixed sleeve 15 and the sleeve 17 is free to move relative to the bracket 7, the hooked end of the locking rod may be moved laterally in a vertical plane by a distance determined by the length of slot 14.

Figure 2:
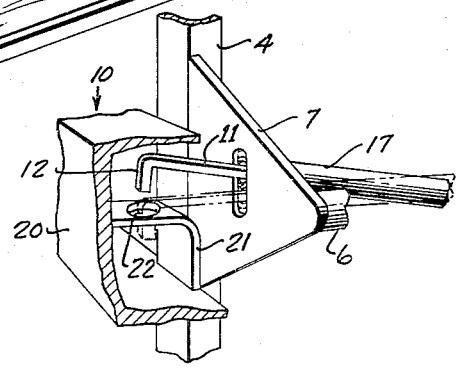
Figure 2 is an enlarged fragmentary view illustrating the manner in which the locking finger is engaged and disengaged.

In a preferred embodiment of the invention, the mounting means 10, which receives the hooked end of the locking device, is preferably in the form of a channel bar 20 fixedly secured to a wall surface of the truck body, or the like, the channel 20 mounting a bracket 21 having an opening 22 therein positioned to receive the hook end of the locking rod 11. As can be best seen in Figure 2, the locking rod 11 may be elevated to the position shown in solid lines and brought into alignment with the opening 22, whereupon it will be lowered into engagement with the opening 22, as shown in dotted lines. Thereafter, the hand wheel will be tightened so as to draw the locking rod 11 inwardly, thereby juxtaposing the bracket 7 to the channel bar 20.

Figure 4:
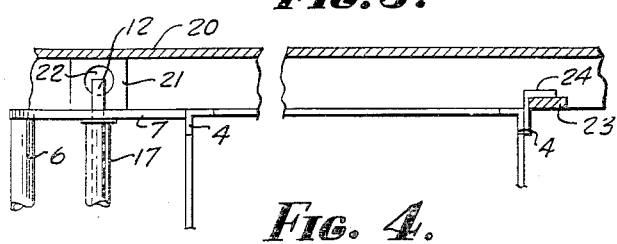
Figure 4 is a fragmentary plan view illustrating the manner in which the opposite ends of the mobile bin are locked in place.

The opposite end of the mobile bin may be conveniently locked to the channel bar 20 by means of vertically disposed bracket 23 (Figures 1 and 4) which will be positioned to be engaged by a flange 24 projecting from the adjacent corner post 4. It will be evident that the relative positions of the brackets 21 and 23 will be governed by the length of the mobile bin. It will be further understood that in securing the bin to the wall mounting means, the flange 24 will be first engaged behind bracket 23, whereupon the opposite or handle end of the bin will be juxtaposed to the bracket 21 and the locking rod engaged in the opening 22. With this arrangement, the mobile bin is positively secured to the wall of the truck and yet, when it is desired to move the bin, it may be readily disengaged simply by releasing the locking rod.

Depending upon the size of the truck body and the size of the mobile bins, an appropriate number of brackets will be provided so that a plurality of bins may be secured along the length of the wall. It is also contemplated that a plurality of the bins may be placed side by side, in which event the flange 24 of the second cart will engage behind the longitudinally extending flange 4a (Figure 1) of the corner post of the first bin. Similarly, the locking bar 11 of the second bin will extend over and engage behind the bracket 8 of the first bin, and consequently may be tightened thereagainst. To this end, it has been found desirable to lower the bracket 8 relative to the bracket 7 so that the entire handle assembly is inclined slightly from the horizontal in the direction of bracket 8. This simply facilitates the locking rod 11 with the bracket 8.

As should now be evident, the instant invention provides a simple yet effective locking device for securing the mobile bin or cart in a freight compartment. Having thus described the instant invention in an exemplary embodiment, what I desire to secure and protect by Letters Patent is:

1. In a mobile bin having a base mounting a plurality of wheels, and a body including vertically disposed corner posts projecting upwardly from said base, a pair of brackets projecting outwardly from an adjacent pair of said corner posts, a push handle extending between said brackets, a locking device also extending between said brackets, said locking device comprising an elongated locking bar having a hook on one end thereof and a threaded section at its opposite end, a slot in one of said brackets, said locking bar extending through said slot with the hooked end thereof lying beyond said slot, a hand wheel threadingly received on the threaded section of said bar, a tubular sleeve surrounding said bar and extending between the inner surface of said last named bracket and said hand wheel, a second sleeve secured to the other of said brackets in general axial alignment with said locking bar, the threaded end of said locking bar being received in said second named sleeve, said sleeves being of lengths such that said hand wheel is held against axial movement, whereby as said hand wheel is rotated, said locking bar will be caused to move in the direction of its length.

2. The device claimed in claim 1 wherein a flange projects from the corner post at the end of the cart opposite said locking device on the same side thereof as the hooked end of said locking bar.

3. The device claimed in claim 2 in combination with bracket means fixedly secured to the wall surface of a freight compartment, such as a truck body, said bracket means comprising a first bracket positioned to be engaged by said flange, and a second bracket having an opening therein positioned to receive the hooked end of said locking bar.

4. The device claimed in claim 3 wherein said brackets are adapted to be supported by a channel-shaped member, the opposite legs of which are horizontally disposed, wherein said first named bracket is vertically disposed and extends between the legs of said channel, and wherein said second named bracket has a horizontally disposed portion lying within the confines of said channel in which said opening is formed.

5. In a locking device for use with mobile bins and the like, a pair of spaced apart brackets, an elongated locking bar having a hook on one end and a threaded section at its opposite end, an elongated vertically disposed slot in one of said brackets, said locking bar extending through said slot with the hooked end thereof lying beyond said slot, a hand wheel threadingly received on the threaded section of said locking bar, a tubular sleeve surrounding said bar and extending between the inner surface of said slotted bracket and said hand wheel, said bar being laterally movable within said tubular sleeve, a second sleeve fixedly secured at one end to the other of said brackets in general axial alignment with said locking bar, the threaded end of said locking bar being received in said last named sleeve, said sleeves being of lengths such that said hand wheel lies between their inner ends and is restrained against axial movement, whereby when said hand wheel is turned, said locking bar will be moved in the direction of its length.

6. The device claimed in claim 5 wherein said first named sleeve is free from attachment to said slotted bracket and serves as a spacer.

7. The device claimed in claim 6 wherein said brackets also mount a push handle extending therebetween, and wherein said second sleeve is anchored to said push handle.

References Cited in the file of this patent

UNITED STATES PATENTS

| | | |
|---|---|---|
| 969,002 | Teachout | Aug. 30, 1910 |
| 1,858,530 | Van Deest | May 17, 1932 |
| 1,859,484 | Wintercorn | May 24, 1932 |
| 2,558,056 | Mitchell | June 26, 1951 |
| 2,808,788 | Stough | Oct. 8, 1957 |